United States Patent

McQuaid

[11] Patent Number: 5,912,457
[45] Date of Patent: Jun. 15, 1999

[54] OPTICALLY-BASED PRESSURE SENSOR HAVING TEMPERATURE COMPENSATION

[75] Inventor: Michael McQuaid, Bel Air, Md.

[73] Assignee: The United States of America as represented by the Secretary of the Army, Washington, D.C.

[21] Appl. No.: 08/778,064

[22] Filed: Dec. 30, 1996

[51] Int. Cl.⁶ .................................................. G01L 1/24
[52] U.S. Cl. ..................... 250/227.17; 250/225; 356/33; 356/365
[58] Field of Search .............................. 250/225, 227.17, 250/227.14, 227.18, 227.19, 227.21, 227.11; 356/32, 33, 34, 35, 351, 364, 365

[56] References Cited

U.S. PATENT DOCUMENTS

| | | | |
|---|---|---|---|
| 4,466,295 | 8/1984 | Wesson | 356/33 |
| 4,518,857 | 5/1985 | McMahon et al. | 250/225 |
| 4,749,854 | 6/1988 | Martens | 356/365 |
| 4,882,716 | 11/1989 | Lefevre | 250/227.17 |
| 4,970,385 | 11/1990 | Tatsuno et al. | 250/227.17 |
| 5,061,847 | 10/1991 | Hazan et al. | 250/227.17 |
| 5,255,068 | 10/1993 | Emo et al. | 356/351 |
| 5,561,522 | 10/1996 | Rapoport et al. | 356/33 |
| 5,589,931 | 12/1996 | Rapoport et al. | 356/33 |
| 5,591,965 | 1/1997 | Udd | 356/32 |
| 5,694,205 | 12/1997 | Gualtieri et al. | 356/33 |

Primary Examiner—Edward P. Westin
Assistant Examiner—John R. Lee
Attorney, Agent, or Firm—Paul S. Clohan; William E. Eshleman; Mark Kelly

[57] ABSTRACT

A pressure sensor includes two birefringent media, one of which is exposed to pressure to undergo pressure-variable birefringence. Polarized light passes through the birefringent media to be modulated in accordance with the pressure and is then made incident on a photodetector to detect the modulation. The use of two birefringent media provides temperature compensation.

22 Claims, 3 Drawing Sheets

OPTICALLY-BASED PRESSURE SENSOR HAVING TEMPERATURE COMPENSATION

FIELD OF THE INVENTION

The invention is directed to a device for providing an optically-based measurement of pressure.

DESCRIPTION OF RELATED ART

The art of measuring pressure via optically-based approaches encompasses a variety of concepts in which a light source (with a given intensity, spectral content, phase/coherence, and polarization state) illuminates an optical element or elements whose characteristics change as a function of pressure. The change in these characteristics is exploited to modulate the intensity of the light reflected from or transmitted through the elements, and the change is measured with a photocell or photocells. Optically-based techniques are desirable since they offer freedom from electrical interference and have the potential for small size, high sensitivity, and high bandwidth response.

One concept for modulating intensity directly is based on the use of a deformable reflective diaphragm. In embodiments of this concept, a single fiber or fiber bundle transmits light to the diaphragm, and a second fiber or fiber bundle collects and transmits the reflected light back to the detector. The intensity of the reflected light is a function of the reflectivity and pressure-sensitive shape of the diaphragm.

A concept for altering the spectral content to produce an intensity change relies on a pressure-induced change in the band gap of a semiconductor material. The band gap change produces a shift in the absorption profile of the material, altering the spectrum of light which propagates through it. The change in content is observed as a change in intensity when an appropriate bandpass filter is employed in front of the photodetector.

Embodiments of concepts based on deformable diaphragms and optical absorption concepts have yet to be proved viable under harsh operating environments. Temperature sensitivity and variable system losses due to connectors, micro- or macro-bending of optical fibers, and misalignment of light sources and detectors are considerable development hurdles.

One method which has been demonstrated to produce an intensity variation related to a change in phase utilizes an etalon, which is an optical element having a transmissive region bounded by two partially reflective surfaces, as the pressure sensitive optical element. The intensity of light reflected from (and transmitted through) an etalon is understood as a superposition of plane waves, the relative phases of which vary as a function of the wavelength of light, the angle of incidence of the light upon the etalon, the reflectivity of the etalon surfaces, and the optical path length of the transmission region. Changes in the relative phase of those waves caused by a change in the optical path length produces a variation in intensity, sometimes referred to as a fringe shift. Embodiments of this concept are typically designed so that a large number of intensity cycles are produced over the pressure range of interest, and the resolution of the technique is given by the pressure/intensity cycle. By counting the number of intensity cycles produced by a pressure transient, the magnitude of the transient can be determined. Because the concept is based on counting intensity cycles, and not the intensity directly, variable intensity losses in the system are not a significant issue.

Although the principles behind this concept are well established and the concept has been demonstrated, it has several practical limitations. Interferometry requires single mode light sources which at present are only achievable with expensive solid state lasers. Moreover, if fiber optics are to be employed in the design, delicate single mode fibers must be utilized. It is also recognized that the intensity modulation is produced for both increases and decreases in pressure. Thus, sophisticated counting techniques must be employed if unambiguous results are to be obtained. Finally, optical path lengths are a function of temperature, and there is no temperature compensation mechanism intrinsic in such concepts. Thus, devices based on interferometric concepts are unlikely to be practical in harsh environments such as ballistic testing.

Another concept that has been demonstrated is based on analyzing the polarization state of light that has propagated through a photoelastic material subjected to uniaxial stress. When stress is applied to such materials in, e.g., the x-direction, the index of refraction increases along that direction, while the index of refraction along y-direction remains constant. A beam of light polarized along the x-direction propagates at slower speed than a beam of light polarized along the y-direction. This difference produces a phase shift which is proportional to the magnitude of the applied stress and the material thickness, and is referred to as the stress induced birefringence. A prism polarizer can be utilized to separate the two orthogonal polarization states, and the magnitude (intensity) of each is measured via separate photocells. The ratio of the difference in the intensities to the sum of the intensities of the two states is a simple function of the applied stress or pressure, and the function is intensity independent. The primary limitations of this approach are that a relatively large number (seven) of optical components are required for the optical processing (between source and detector), and the optical train is complex and difficult to align. Also temperature dependent effects are not addressed, and in applications where fiber optic coupling is desired, at least three fibers must be connected to the sensor head.

BRIEF DESCRIPTION OF THE INVENTION

An objective of the invention is to provide a device for sensing both static and transient pressures.

Another objective is to provide an optical pressure sensor having a simple, compact design with minimal alignment difficulty.

Another objective is to provide an optical pressure sensor which intrinsically compensates for temperature changes.

Another objective is to provide an optical pressure sensor which is implemented with a single multimode optical fiber interface.

Another objective is to provide an optical pressure sensor which employs wavelength division multiplexing (WDM).

To achieve these and other objectives, the present invention is directed to a sensor for making optically-based pressure measurements via stress induced phase changes. The sensor employs two birefringent media arranged along an optical axis. The first is for temperature compensation. The second undergoes pressure induced strain.

The present invention provides an improved concept for making optically-based pressure measurements via stress induced phase changes. Optical processing is achieved with just three, inexpensive optical elements that are in an in-line configuration. This permits simplicity and compactness in the mechanical design, and minimizes alignment difficulty. The design intrinsically compensates for temperature changes and can be implemented with an inexpensive light source such as a light emitting diode. Optical access to the sensor head for both source transmission and signal collection to the sensor head can be implemented with a single multimode optical fiber. Because it is based on stress-induced phase changes and a broadband source can be employed, wavelength division multiplexing (WDM) can be utilized to address variable system loss issues.

BRIEF DESCRIPTION OF THE DRAWINGS

A preferred embodiment of the invention will now be disclosed with reference to the drawings, in which.

DETAILED DESCRIPTION OF THE PREFERRED EMBODIMENT

Figure 1:
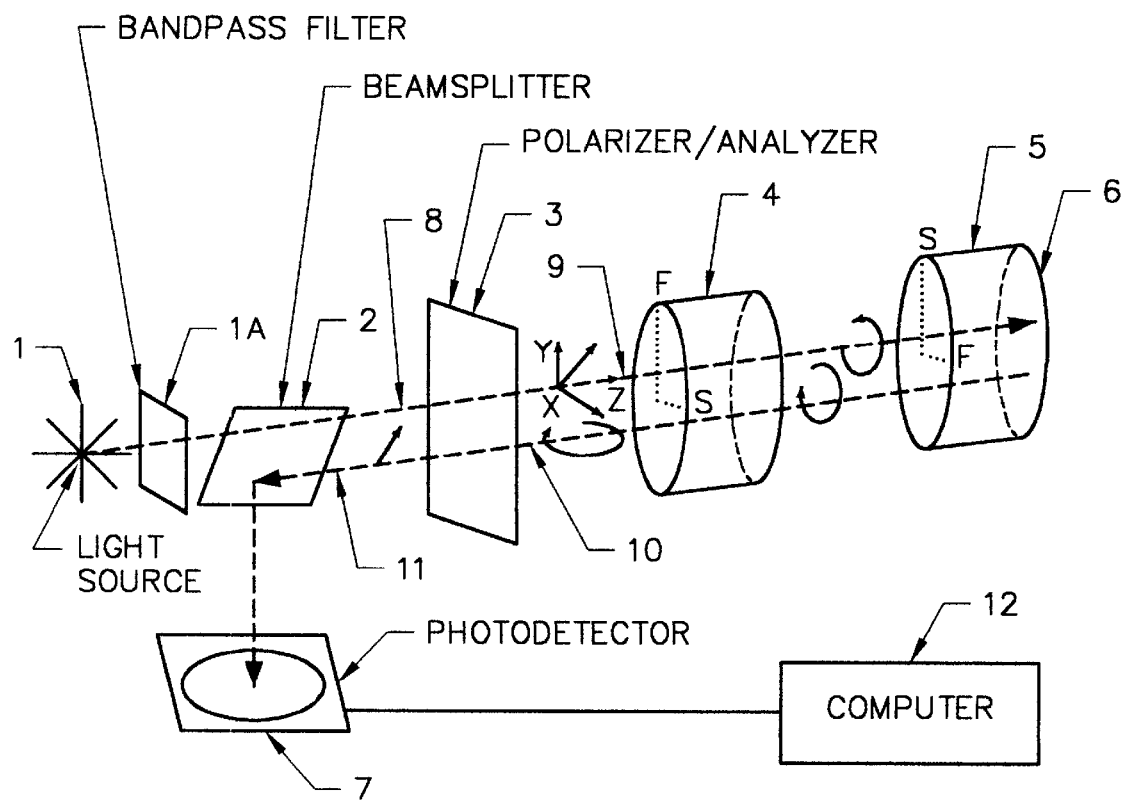
FIG. 1 shows a block diagram of a sensor according to the preferred embodiment of the invention.

FIG. 1 shows a block diagram of a sensor according to the preferred embodiment of the invention. The basic components include light source (1) that is coupled into the sensor head, producing an unpolarized beam (8) propagating in the +z-direction, a beamsplitter (2), a polarizer/analyzer (3) in the x-y plane and oriented to produce linearly polarized light with an angle of $\pi/4$ (45°) to the x-axis, birefringent crystal (4) employed for temperature compensation with its fast axis oriented along the y axis, and a pressure sensing birefringent crystal (5), the fast axis of which is aligned along the x-axis, and the end of which is coated with a reflective coating (6) to produce specular reflection. Polarizer/analyzer (3) polarizes beam (8) to produce linearly polarized light (9) and attenuates the orthogonal component of the reflected (pressure modulated) beam (10) to produce output beam (11). Photodetector (7) is utilized to monitor the output intensity of output light (11) and to output the output intensity to computer (12), which calculates the pressure in a manner to be described below. Pressure sensing crystal (5) is mounted such that pressure induces strain in the z-direction. Temperature compensation crystal (4) is mounted such that it remains unstressed. The phase difference between the x and y polarization components of the linearly polarized light (9) exiting polarizer (3) is a function of the wavelength of the light ($\lambda$) and the difference in optical path lengths for the x and y orientations. The optical path length is a function of the distance traveled in each crystal, which in this configuration is twice the crystal thickness, and the index of refraction of the fast and slow axes $-n_f$ and $n_s$, respectively. The phase difference $\Gamma$ produced by propagation through the crystals is given by $$\Gamma(\lambda,p)=(4\pi/\lambda)(z_1(p_0)(n_f(\lambda,p_0)-n_s(\lambda,p_0))-z_2(p)(n_s(\lambda,p)-n_f(\lambda,p))) \quad (1)$$

where $p_o$ is the ambient pressure and p is the pressure being measured.

The preferred embodiment utilizes sapphire crystals in elements (4) and (5), that have been cut and polished into windows of identical thickness ($z_1(p_o)=z_2(p_o)=z(p_o)$) and with the optical (c) axis parallel to the window surfaces. The indices of refraction, photoelastic constants, dispersion, and compressibility of such crystals are known and well-behaved over a wide pressure range. Light source (1) is preferably a sodium vapor lamp which is bandpass filtered by bandpass filter 1A to attenuate all but the D-line emission at $\lambda$=589 nm. Alternate sources such as broad(er) band light emitting diodes (LED's) may be employed. However, the source should have a coherence length which is short compared to the length of the birefringent crystals. This will avoid performance degradation due to interference effects. Anti-reflection coatings will also reduce interference effects and background levels.

For the case in which the pressure sensing crystal (5) is unstressed, there is no net phase change associated with propagation through the crystals, and reflected beam (10) remains linearly polarized and oriented at an angle of $\pi/4$ (45°) to the x-axis. Since the light beam is parallel to the polarizer orientation, the light beam passes unattenuated through polarizer (3), producing the maximum output intensity for the given system. However, as pressure is applied to pressure sensing crystal (5), a phase change is produced which is a function of the compressibility and photoelastic properties of the crystal. Phase changes between 0 and $2\pi$ produce eliptically polarized light that has a component orthogonal to the polarizer orientation. Since this component is attenuated by polarizer (3), the output intensity of photodetector (7) is less than in the unstressed case. If pressure sensing crystal (5) is stressed such that the phase difference equals $\pi$, corresponding to a $\lambda/2$ difference in the optical pathlengths for the x and y axes, the reflected beam (10) will be linearly polarized orthogonal to the polarizer orientation, and thus completely attenuated by it. With an appropriate selection of crystal thickness and light source wavelength, the response between the intensity minimum ($\Gamma=\pi$) and maximum ($\Gamma=0$) may be customized to give a single valued function for the pressure range of interest. In alternate embodiments, the pressure sensing crystal (5) may be prestressed, or its thickness relative to the temperature compensation crystal (4) selected, in a manner that zero intensity corresponds to zero pressure, or to a value which optimizes the response for a given pressure range.

Temperature sensitivity is minimized, since temperature-induced phase shifts in pressure sensing crystal (5) are compensated for by an equal and opposite phase shift in the crystal which is not subjected to pressure. Also, if a broadband light source is to be utilized, wavelength division multiplexing can be employed to monitor the reflected intensity for more than one wavelength. A ratio can be calculated of the intensities for the different wavelengths to mitigate the effect of variable system losses.

The operation of the sensor of FIG. 1 will now be described in greater detail.

For a light beam propagating in the z-direction of a space-fixed Cartesian coordinate system, in the absence of interference effects, the phase retardation ($\Gamma(\lambda,p)$) at a static pressure (p) which is generated by a naturally birefringent material whose optical c-axis is oriented perpendicular to the z-axis is given by $$\Gamma(\lambda,p)=(2\pi/\lambda)(n_f(\lambda,p)-n_s(\lambda,p))z(p) \quad (2)$$

where $\lambda$ is the vacuum wavelength of light, $n_f(\lambda,p)$ and $n_s(\lambda,p)$ are the real parts of the pressure and wavelength-dependent complex indices of refraction for the fast and slow axes, respectively, and $z(p)$ is the pressure-dependent thickness of the crystal. The wavelength and pressure dependencies of the indices of refraction are related to the material's dispersion and photoelastic properties, respectively. For the configuration in FIG. 1, the transmission and reflection back through the pair of crystals (4) and (5) produces a phase retardation $$\Gamma(\lambda,p)=(4\pi/\lambda)(z_1(p_0)(n_f(\lambda,p_0))-z_2(p)(n_s(\lambda,p)-n_f(\lambda,p)) \quad (3)$$

where $z_1(p_o)$ is the length of temperature compensating crystal (4), $z_2(p)$ is the length of pressure sensing crystal (5), $p_o$ is the ambient pressure experienced by temperature sensing crystal (4) and p is the pressure to be measured. For $z_1(P_0) = z_2(p_o) = z(p_o)$, the phase difference $\Gamma(\lambda, p_0) = 0$. In characterizing this system, an expression of Eq. (3) has been derived that allows the data available on the system to be the input into a computer program which calculates the pressure as a function of the output intensity measured at photodetector (7). The derivation of that expression is as follows.

The change in phase produced by a change in pressure is $$\frac{\partial \Gamma(\lambda, p)}{\partial p} = \tag{4}$$

$$\frac{4\pi}{\lambda} \left( z \frac{\partial (n_s(\lambda, p) - n_f(\lambda, p))}{\partial p} + (n_s(\lambda, p) - n_f(\lambda, p)) \frac{\partial z(p)}{\partial p} \right)$$

and $$\int d\Gamma = \tag{5}$$

$$\frac{4\pi}{\lambda} \int \left( z \frac{\partial (n_s(\lambda, p) - n_f(\lambda, p))}{\partial p} + (n_s(\lambda, p) - n_f(\lambda, p)) \frac{\partial z(p)}{\partial p} \right) dp$$

If, as in the case to be discussed, the integrand on the right-hand side is independent of p, then $$\Gamma(\lambda, p) = \Gamma(\lambda, p_o) + \tag{6}$$

$$\frac{4\pi}{\lambda} \left( z \frac{\partial (n_s(\lambda, p) - n_f(\lambda, p))}{\partial p} + (n_s(\lambda, p) - n_f(\lambda, p)) \frac{\partial z(p)}{\partial p} \right) \Delta p$$

where $\Delta p = (p - p_0)$

If external losses (reflections at ambient-crystal interfaces), internal losses (crystal absorption), and interference effects are negligible, the output intensity $I_0(\lambda, p)$ for the configuration given in FIG. 1 is $$I_0(\lambda, p) = I_i(\lambda)(0.5 + 0.5 \cos(\Gamma(\lambda, p))) \tag{7}$$

where $I_i(\lambda)$ is the wavelength-dependent incident intensity. The detected output is obtained by integrating over of the wavelength distribution of the light source and correcting for the wavelength sensitivity of the detection system, $$I_0(p) = \int w(\lambda) I_i(\lambda)(0.5 + 0.5 \cos(\Gamma(\lambda, p))) d\lambda \tag{8}$$

where $w(\lambda)$ is a weighting factor related to the wavelength sensitivity of the detection system.

To demonstrate the response produced in an actual system, a case study is provided. The light source (1) is a sodium lamp which is wavelength filtered so that only the sodium D-line at 589 nm is incident on the polarizer. This source (1) was selected because the indices of refraction and photoelastic properties for sapphire at this wavelength have been measured. Pressure is applied uniaxially to a 1.0-mm thick sapphire crystal (pressure sensing crystal) (5) that has been cut and polished into a window 1 mm thick ($z_2(p_o) = 1$ mm) and with the optical (c) axis parallel to the window surfaces. A second identical crystal (temperature compensation crystal) (4) is employed for temperature compensation. Sapphire is naturally birefringent and has high internal transmittance from 200 to 6000 nm. Values of $n_f(\lambda, p_0) = 1.760$ and $n_s(\lambda, p_0) = 1.768$ have been reported at 589 nm. To a first approximation, the off-diagonal stress-optic constants are negligible, and thus, $\partial (n_f(\lambda, p) - n_s(\lambda, p))/\partial p$ is approximately zero for uniaxially applied stress. For volumetrically applied stress, this term may be significant. The value for $\partial z/\partial p = -z/379$ kbar is derived from the reported compressive modulus $z\partial p/\partial z = -379$ kbar. To maximize the response, a reflective coating (6) applied to crystal (5) is selected that minimizes loss in reflected intensity. For this purpose, silver is one of many possible appropriate choices. Substituting these values into Eqs. (6) and (7), and integrating Eq. (8) with $I_i(\lambda)$ equal to a delta function such as $I_i(\lambda) = \delta(\lambda - 589$ nm) and $w(\lambda)$ arbitrarily set to 1, the functional form of the $I_o(p)$ reduces to $$I_0(p) = 0.5 + 0.5 \cos(0.1433\pi\Delta p) \tag{9}$$

where the units of $\Delta p$ are kbars. This function is single valued for $\Delta p$ from 0 to 7 kbar (0 to 100,000 psi). Solving Eq. (9) for $\Delta p$ and substituting $\Delta p \equiv p - p_o$, one obtains $$p = p_o + \frac{1}{0.1433\pi} \cos^{-1}(2I_o(p) - 1) \tag{10}$$

which is easily calculated by a suitably programmed computer.

Figure 2:
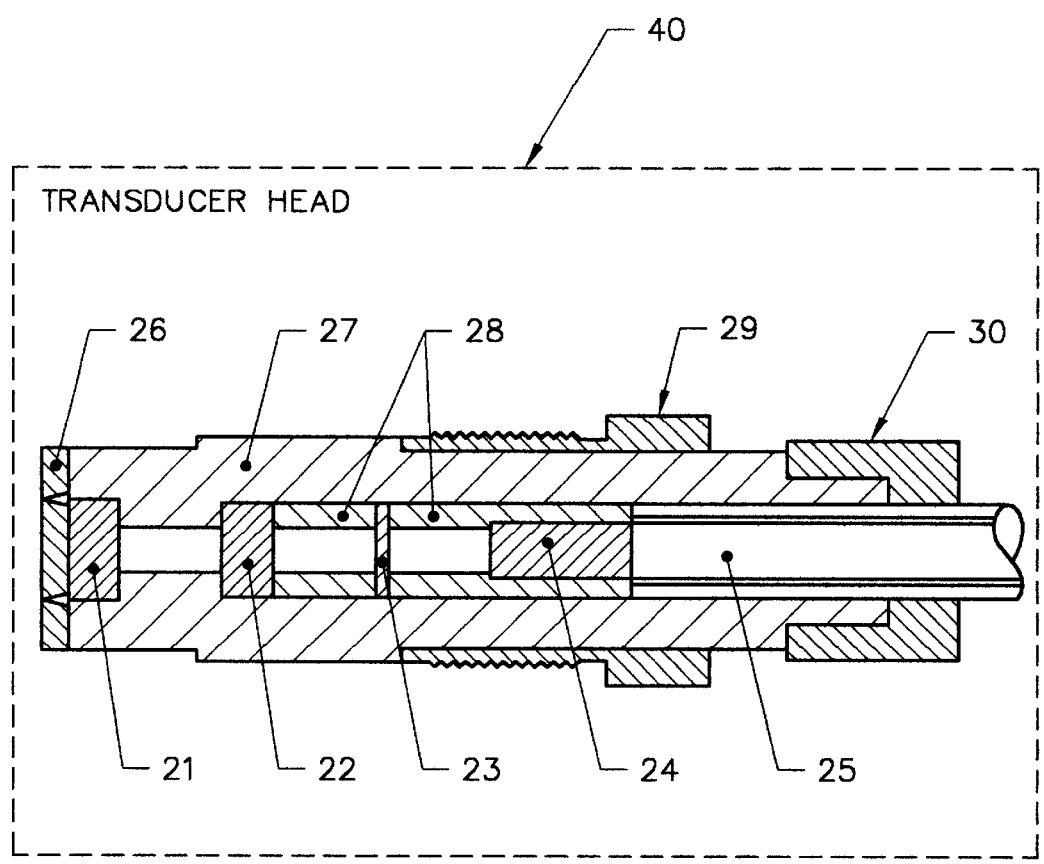
FIGS. 2 and 3 show a sensor head which implements the invention for ballistic testing.
Figure 3:
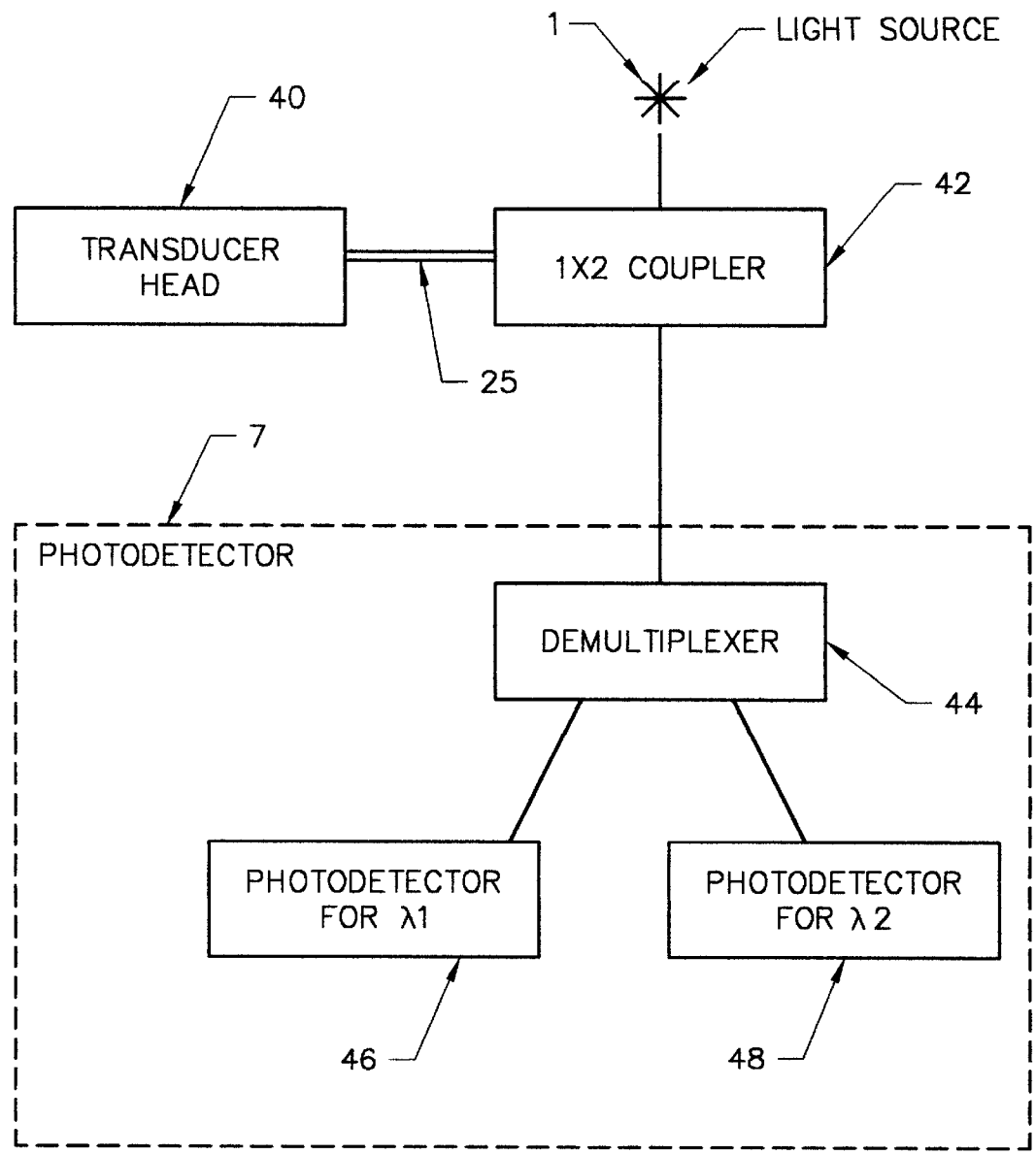

FIGS. 2 and 3 show a schematic diagram of a sensor, including transducer head (40), which might be employed for ballistic testing. The optical elements include pressure sensing crystal (21), temperature compensation crystal (22), polarizer/analyzer (23), and gradient index lens (collimating lens) (24) which collimates the output of optical fiber (25), which may be a single- or multimode optical fiber or an optical fiber bundle. Mechanical components include diaphragm (26) to protect the reflective coating on crystal (21) and ensure a seal of sensor housing (27). Optically black spacers (28) are employed to reduce spurious reflections and facilitate mounting of polarizer (23) and collimating lens (24). Sensor housing (27) is secured to the chamber wall via threaded sleeve (29). To facilitate connecting the optical fiber (25) to the transducer head housing (27), SMA terminator (30) is employed. As shown in FIG. 3; the optical fiber (25) is connected to 1×2 coupler (42) to couple light from the light source (1) into the optical fiber (25) and to couple light from the optical fiber (25) into the photodetector (7). To increase the reliability of the pressure measurement, it is desirable to provide a broadband light source and to replace the photodetector (7) with demultiplexer (44), photodetector (46) for a first wavelength and photodetector (48) for a second wavelength.

The present invention is directed to a device that provides an optically-based measurement of pressure. The concept offers intrinsic temperature compensation and can be used in either static or highly transient pressure environments. Inexpensive light sources, detectors and optical elements can be employed, and they may be coupled via multimode optical fibers. The invention has application for any pressure regime, but will be particularly advantageous for electrically or physically harsh environments. Embodiments of this concept will provide a suitable replacement for piezoelectric-based pressure transducers used in ballistic testing of electrothermal chemical or electromagnetic gun propulsion systems. Other modifications and uses will be readily apparent to those skilled in the art who have reviewed this specification. Therefore, the invention should be construed as limited only by the appended claims.

I claim:

1. A sensor for sensing pressure, the sensor comprising:
   light emitting means for emitting a linearly polarized light beam;
   a birefringent sensing element, disposed in the path of the polarized light beam and having an optical path length which is responsive to the pressure, for imparting a phase modulation to the polarized light beam in accordance with the pressure to produce a modulated polarized light beam;

a birefringent temperature compensation element disposed in the path of the polarized light beam for compensating for temperature variations in the birefringent sensing element such that the temperature variations are effectively offset;

an analyzer for attenuating an orthogonal component of the modulated polarized light beam to produce an output beam having an intensity that is a function of the pressure; and detecting means, receiving the output beam, for detecting the intensity of the output beam.

2. A sensor as in claim 1, wherein the birefringence of the second birefringent medium is stress-induced.

3. A sensor as in claim 1, wherein the birefringent sensing element has a reflective coating on one surface thereof, the polarized light beam being transmitted through the birefringent sensing element and reflected by the reflective coating.

4. A sensor as in claim 3, wherein:

the light emitting means comprises a light source for emitting light and a polarizer for polarizing the light emitted by the light source to produce the polarized light beam; and the polarizer also functions as the analyzer and is disposed in a path of the modulated polarized light beam between the birefringent sensing element and the detecting means.

5. A sensor as in claim 1, wherein the light emitting means comprises a light source for emitting light and a polarizer for polarizing the light emitted by the light source to produce the polarized light beam.

6. A sensor as in claim 5, wherein: the sensor further comprises a transducer head containing the polarizer, the birefringent temperature compensation element and the birefringent sensing element; and the light emitting means further comprises fiber optic means for conveying the light produced by the light source into the transducer head.

7. A sensor as in claim 6, wherein the fiber optic means comprises a single-mode optical fiber.

8. A sensor as in claim 6, wherein the fiber optic means comprises a multimode optical fiber.

9. A sensor as in claim 6, wherein the fiber optic means comprises a fiber optic bundle.

10. A sensor as in claim 6, wherein the fiber optic means comprises:

an optical fiber; and a 1×2 coupler to couple (i) the light emitted by the light source into the optical fiber and (ii) the modulated polarized light beam from the optical fiber to the detecting means.

11. A sensor as in claim 10, wherein:

the light emitting means emits the polarized light beam as a broadband light beam; and the detecting means comprises multi-wavelength detecting means for detecting the intensity in a plurality of wavelength components of the output beam.

12. A sensor as in claim 11, wherein the multi-wavelength detecting means comprises:

a demultiplexer for splitting the output beam into the plurality of wavelength components; and a plurality of photodetectors, each receiving one of the plurality of wavelength components and detecting the intensity in said one of the plurality of wavelength components.

13. A sensor as in claim 1, wherein:

the light emitting means emits the polarized light beam as a broadband light beam; and the detecting means comprises multi-wavelength detecting means for detecting the intensity in a plurality of wavelength components of the output beam.

14. A sensor as in claim 13, wherein the multi-wavelength detecting means comprises:

a demultiplexer for splitting the output beam into the plurality of wavelength components; and a plurality of photodetectors, each receiving one of the plurality of wavelength components and detecting the intensity in said one of the plurality of wavelength components.

15. A sensor as in claim 1, further comprising calculating means, receiving an output of the detecting means, for calculating the pressure as a function of the intensity.

16. A sensor as in claim 15, wherein:

the intensity varies according to the modulation as a function of the pressure, the function having an inverse function; and the calculating means calculates the pressure from the intensity in accordance with the inverse function.

17. A sensor as in claim 1, wherein:

the birefringent temperature compensation element has a fast axis in a first direction; and the birefringent sensing element has a fast axis in a second direction which is perpendicular to the first direction.

18. A sensor as in claim 17, wherein the first and second directions are perpendicular to a direction of propagation of the polarized light beam.

19. A sensor as in claim 18, wherein the polarized light beam has a plane of polarization which is at an angle of 45° to the first and second directions.

20. A sensor as in claim 1, wherein the light emitting means comprises:

a light source for emitting light; and a bandpass filter for passing a single emission line of the light emitted by the light source.

21. A sensor as in claim 1, wherein the light emitting means has a coherence length less than a thickness of each of the birefringent temperature compensation element and birefringent sensing element.

22. A sensor as in claim 1, wherein the birefringent temperature compensation element is further selected and aligned so that the sum of the temperature induced phase shifts of the temperature compensation element and the birefringent sensing element are substantially equal and opposite.

* * * * *